United States Patent [19]
Chirgwin

[11] 3,851,232
[45] Nov. 26, 1974

[54] ELECTRIC VEHICLE PROPULSION SYSTEM

[75] Inventor: Keith M. Chirgwin, Palos Verdes Estates, Calif.

[73] Assignee: The Garrett Corporation, Los Angeles, Calif.

[22] Filed: Apr. 4, 1973

[21] Appl. No.: 347,719

Related U.S. Application Data

[63] Continuation of Ser. No. 89,678, Nov. 11, 1970, abandoned.

[52] U.S. Cl. .............................................. 318/150
[51] Int. Cl. ............................................ H02p 7/16
[58] Field of Search ........... 318/17, 49, 50, 89, 111, 318/112, 113, 150, 161; 307/37, 42, 112, 113, 115

[56] References Cited
UNITED STATES PATENTS

| | | | |
|---|---|---|---|
| 1,710,792 | 4/1929 | Storer et al. | 318/89 X |
| 2,587,648 | 3/1952 | Pestarini | 318/161 X |
| 2,589,553 | 3/1952 | Storsand | 318/150 X |
| 3,541,409 | 11/1970 | Storsand | 318/150 |

FOREIGN PATENTS OR APPLICATIONS

| | | | |
|---|---|---|---|
| 4,066 | 2/1908 | Great Britain | 307/37 |

Primary Examiner—Robert K. Schaefer
Assistant Examiner—W. E. Duncanson, Jr.
Attorney, Agent, or Firm—Orville R. Seidner; Arthur J. Miller; Robert S. Swecker

[57] ABSTRACT

A plurality of electrical devices are coupled by circuit means, including switching contactors, in series in one switching mode, and in parallel in another switching mode for current flow sense in one of the devices in a reverse direction. The devices may be dynamoelectric machines, which may be separately excited, and one of which is coupled to a rotatable apparatus such as an inertial device adapted selectively to absorb and equivalently store mechanical power output from or to equivalently restore and furnish mechanical power input to the device to which it is coupled. The arrangement is advantageously utilized in an electrically motivated vehicle such as an electrical propulsion system for rapid transit cars or trains. Conveniently, the switching circuit may selectively couple the traction motors to the power supply conductors for regenerative braking or to conventional power absorbing brake resistors for dynamic braking.

99 Claims, 8 Drawing Figures

INVENTOR.
KEITH M. CHIRGWIN,
By Orville R. Seidner
AGENT.

INVENTOR.
KEITH M. CHIRGWIN,
By Orville L. Leidner
AGENT.

ELECTRIC VEHICLE PROPULSION SYSTEM

RELATED APPLICATIONS

This application is a continuation of copending United States patent application Ser. No. 89,678, filed Nov. 11, 1970, now abandoned and assigned to the assignee of this application.

BACKGROUND OF THE INVENTION

This invention pertains broadly to the act of controlling electrical devices, and is generally concerned with the control of dynamoelectric machines. A particular area of application of the invention is that portion of the electrical art encompassing propulsion systems for electrically propelled vehicles such as rapid transit cars and trains.

Characteristically, in those vehicles not equipped with an on-board power source, the traction power is supplied to the electric traction motors from an overhead catenary or a third rail. For motive power it has been customary to provide these vehicles with self-excited traction motors such as the series wound type in order to have the advantage of the torque characteristic of such motors in connection with the need to effect acceleration from a standing start of a relatively massive vehicle. There are usually four such motors on each vehicle, and the control of power applied to them has been effected by a mechanically operated "cam" control unit which effects successive step-wise series and parallel couplings of the motors and the voltage dropping resistors to the power source. The resistors have been necessary in order to reduce the starting and initial acceleration current requirements of the motors an to an acceptable value. Obviously the power dissipation in the dropping resistors represents power wasted, with subsequent generated heat radiated to the bottom of the vehicle, and to the tunnel in the case of subway vehicles. The heat radiation problem is aggravated by the fact that the greatest amount of heat is produced when the vehicle is getting underway, hence there may be a minimum of convection cooling air flow over the hot resistors unless auxiliary blowers are provided for cooling them.

SUMMARY OF THE INVENTION

The present invention provides a new and novel system which obviates completely the need for voltage dropping resistors as normally required for starting and accelerating electrically propelled vehicles. Furthermore, the starting and acceleration of the vehicle may be accomplished by the disclosed system in an infinitely variable mode that is completely free of the starting jerk and the accelerating jerks at each cam contacting advance of the usual cam control unit.

In addition to the motoring start and acceleration modes discussed above, the system to be disclosed is readily adaptable to regenerative or dynamic braking modes with the traction motors operating as generators. In both motoring and generating operations of the motors, the system disclosed is particularly characterized by a minimum of equipment. Of particular note is the novel fact that the invention provides an exteriorly powered vehicle with many of the advantages inherent in a vehicle having its own on-board power source. On the other hand, the vehicle powered according to the invention does not require the massive on-board power source usually associated with vehicles of that type.

The objective of the invention is accomplished by providing the vehicle with an auxiliary dynamoelectric machine coupled to rotatable apparatus which is adapted to absorb power from or furnish power to the auxiliary machine. Conveniently the apparatus may be an inertial device such as a flywheel. Control circuit means are provided for the selective energization of the auxiliary dynamoelectric machine and the traction motors, which are preferably separately excited.

As noted hereinabove, excessive power is wasted in the voltage dropping resistors of the vehicles of the prior art during the start and initial acceleration modes of operation. In the present invention, the auxiliary dynamoelectric machine is running at idle when the vehicle is in a standing-ready, or poised condition for passenger loading. Upon the application of energization to the traction motors, the auxiliary dynamoelectric machine absorbs the power normally wasted in dropping resistors and imparts it to the energy storing flywheel which is accelerated by the auxiliary machine.

The coupling of the traction motors and the auxiliary machine by the control circuit means is such that the auxiliary machine absorbs power from the main electrical power source while the vehicle accelerates up to a speed which corresponds to about one-half of an arbitrary vehicle speed designated herein as "base" speed. As the vehicle continues to accelerate above the initial one-half base speed, the auxiliary machine changes over from a motoring mode to a generating mode and has shaft power restored to it by the flywheel. The generated power from the auxiliary machine is then supplied to the traction motors to supplement the power drawn by them from the main power source. At the base speed of the vehicle the auxilary machine has been decelerated to a speed slightly less than its initial idling speed and the control circuit means thereupon effects a transition mode of coupling of the traction motors and auxiliary dynamoelectric machine.

Preferably, the initial coupling of the motors and machine places their running current windings in series across the power source conductors. At the base speed the transition is accomplished by switching the running windings of the motors and machine from series to parallel across the power conductors, all as explained in detail hereinafter.

Of particular note is the fact that with the system of the invention, the rotatable apparatus need be only nominally sized. That is, whereas in the prior art it has been proposed to provide a vehicle with an auxiliary power source such as an inertia device, the energy storage problems have been so great as to require massive flywheels in order to effect the purpose of the systems proposed therein. In the present invention the return of energy from the inertial apparatus to the auxiliary dynamoelectric machine, and hence to assist the traction motors, is required during only a small portion of the acceleration mode of the vehicle. Thus the energy storage source may be aptly described as a "mini-flywheel."

A novel switching arrangement is provided in the control circuit means whereby the switching of the running windings from series to parallel is accomplished by two single-pole, normally-open contactors. The circuit arrangement is such that at base speed of the vehicle the voltage across the contactors is substantially zero, whereupon the contactors are closed to place the two sets of series-coupled traction motors and the auxiliary dynamoelectric machine in parallel across the main power source.

DESCRIPTION OF THE PREFERRED EMBODIMENTS

Figure 1:
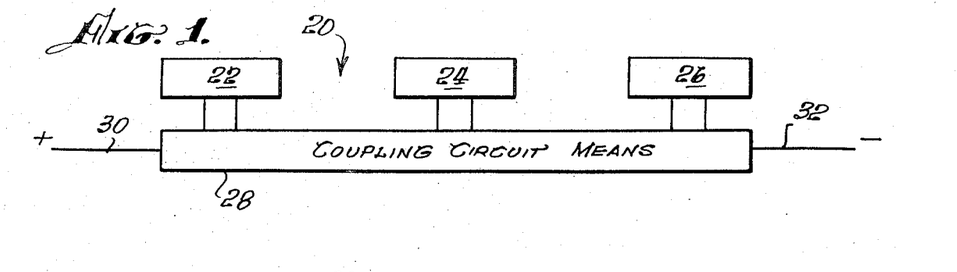
FIG. 1 is a block diagram in schematic form, illustrating the basic elements of the invention.

Referring to FIG. 1, the block diagram is schematically illustrative of a system 20 of a plurality of electrical devices shown herein as three in number and referenced as 22, 24 and 26. The system 20 includes circuit means 28 arranged for a multiplicity of couplings of the devices 22, 24 and 26 to each other and to the power supply conductors 30 and 32 which latter are adapted to supply electrical power to the system for the operation of the devices. As indicated by the "plus" and "minus" signs, the conductors 30 and 32 may supply direct current to the devices. On the other hand, the conductors 30 and 32 may be coupled to a source of alternating current at the discretion of the operator of the system or if the nature of the devices require it. The polarity signs are included here merely for clarifying the references to "voltage direction sense" and "current direction sense" as mentioned hereinafter.

Figure 2:
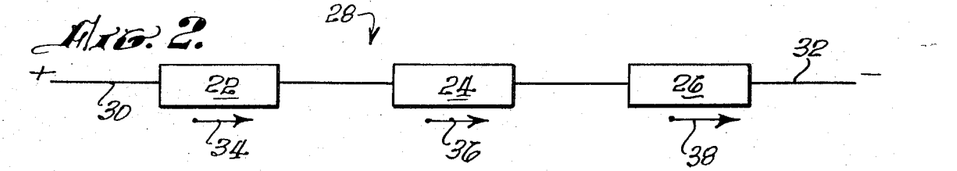
FIG. 2 is a block diagram showing one of the coupled modes of the devices and system utilizing the invention.

FIG. 2 is illustrative of a series coupling mode effected by the circuit means 28 of the devices 22, 24 and 26 with the power supply conductors 30 and 32, and it will be seen that the voltage direction sense as applied by the power supply conductors is adapted to provide current flow in the direction of the arrows 34, 36 and 38.

Figure 3:
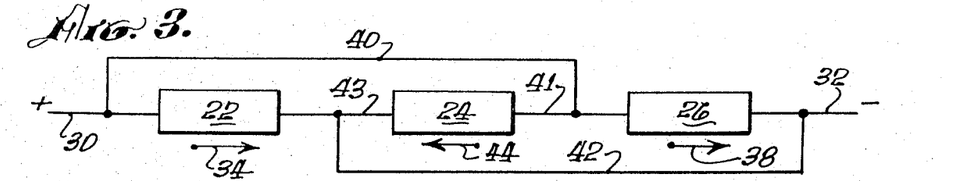
FIG. 3 is a block diagram similar to FIG. 2 but showing another coupled mode of the using devices.

FIg. 3 is illustrative of a parallel coupling mode effected from the series mode of FIG. 2, the conductor 40 having coupled the voltage source conductor 30 to the common coupling 41 of the devices 24 and 26 and the conductor 42 effecting a similar coupling of the voltage source conductor 32 to the common coupling 43 of the devices 24 and 22. It is seen that the voltage source is now adapted to provide a current flow in a reverse direction sense through the device 24 as indicated by the arrow 44, whereas the current flow sense in the devices 22 and 26 remains the same. As will be brought out hereinafter, the device 24 may also have generator characteristics providing a voltage directional sense counter to that of the voltage from the conductors 30 and 32, and thus effect a current flow in a reverse direction sense to that of the arrow 44, i.e., in the same direction sense as denoted by the arrow 36 in FIG. 2.

Figure 4:
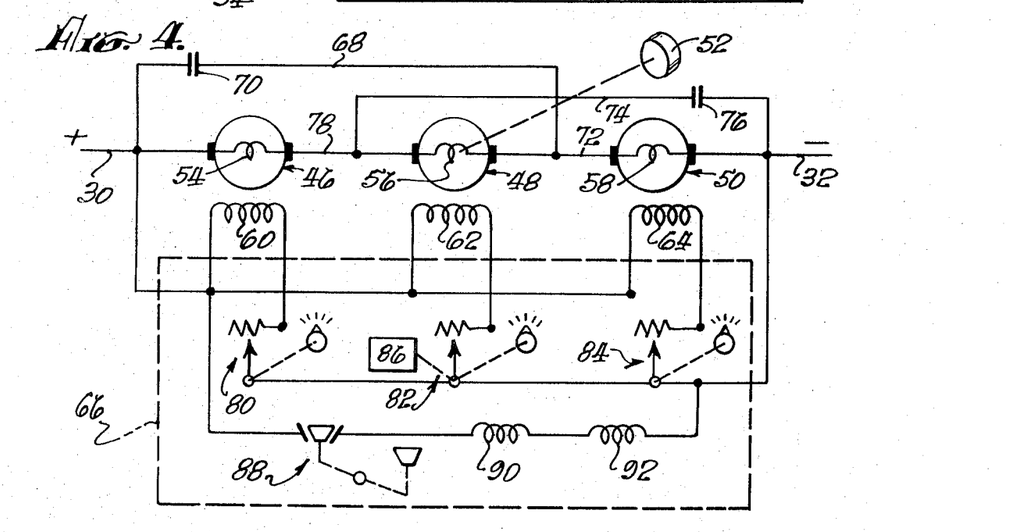
FIG. 4 is a schematic diagram showing the invention applied to a plurality of dynamoelectric devices.

FIG. 4 is illustrative of a system employing the novel circuit arrangement dealt with in general terms hereinabove. In the case of FIG. 4 the electrical devices, which correspond to the devices 22, 24 and 26 above, are depicted as dynamoelectric machines 46, 48 and 50, respectively.

The device 48 is shown as drivingly coupled to a rotatable apparatus 52 which is adapted to absorb energy from and then to restore the absorbed energy to the dynamoelectric device 48. In that respect the machine 48 and the apparatus 52 combine to form what will be referred to hereinafter as an energy pack. Appropriately, and preferably, the apparatus 52 may take the form of a simple inertia device such as a flywheel. On the other hand, other apparatus to be described in connection with FIG. 8 may be utilized to absorb and equivalently store or to equivalently re-store and furnish mechanical power to the machine 48.

In the embodiment shown, machines 46, 48 and 50 are provided respectively with running current armature windings 54, 56 and 58 and exciting field windings 60, 62 and 64 which are preferably of the separately excited type, being coupled by a circuit means 66 to the voltage source conductors 30 and 32. A conductor 68 couples one power supply conductor 30 through a contactor switching means 70 to the common coupling 72 of the running current windings 56 and 58 of machines 48 and 50, and a conductor 74 couples the other power source conductor 32 through a contactor switching means 76 to the common coupling 78 of the running current windings 54 and 56 of machines 46 and 48. Contactor means 70 and 76 may be manually operated, or may be of the magnetic or solenoid type arranged to be energized by the circuit means 66.

The circuit means 66 may be of any preferred type for use to which the apparatus is to be put, as will be evident to those skilled in the art. In elementary form the circuit means 66 may comprise variable resistors 80, 82 and 84 coupled respectively between field windings 60, 62 and 64 and the power source conductors 30 and 32 for variable excitation of the fields, resistors 80, 82 and 84 being arranged for manual operation if desired. It is also obvious to those skilled in the art that automatic control means or solid-state type controls could be utilized to control the current in the fields 60, 62 and 64.

Additionally the machine 48 may be provided with a speed sensor (not shown) arranged to actuate a constant speed control 86, for example, to effect control of the resistor 82 and hence the current in the field 62 of machine 48. The circuit 66 may also comprise a push button switch 88 arranged to close or open the circuit from conductor 30 to conductor 32 through the solenoid coils 90 and 92 which are adapted to actuate the contactors 70 and 76 respectively, as mentioned hereinabove.

The control circuit means 66, as described aforesaid, is quite elementary in the disclosed form and function, and it is at once apparent to those skilled in the art that other more sophisticated ciruit arrangements could be utilized for the control of the machines 46, 48 and 50 and for effecting the connection modes of their excitation field windings and running current windings vis-a-vis the supply conductors 30 and 32.

The circuit means may, for example, be employed to effect operational modes of the dynamoelectric machines substantially along the following lines, it being assumed for this purpose that the machines 46 and 50 are coupled to their mechanical loads and that the machine 48 may or may not be nominally loaded by a fairly constant load in addition to the inertial loading applied by the flywheel 52. As a further condition of this assumed operational mode, it will be further assumed that machines 46 and 50 are not running but are poised for start and acceleration of their loads from a standing condition, and that machine 48 is idling at a nominal reference speed and drawing merely nominal current, and with the excitation of its field winding 62 under the control of the speed control 86. Under the assumed conditions the contactors 70 and 76 are open and the excitation field windings 60 and 64 of machines 46 and 50 are unenergized by reason of an open circuit through resistors 80 and 84, hence not excited. Thus, although the idling current for machine 48 is carried by the armature, windings 54 and 58, the machines 46 and 50 are not reactively excited and do not apply torque to their respective loads.

Start and acceleration of machines 46 and 50 is initiated by exciting their field windings 60 and 64, and this may be done by closing their circuits with conductors 30 and 32 and ramping the current through the variable resistors 80 and 84 up to maximum to effect a maximum torque by the machines 46 and 50 on their respective loads. At the same time, the control of field 62 of machine 48 is removed from the control of the speed control 86 and placed under manual or automatic command to enable the machine 48 to accelerate to substantially top speed which results in the accumulation and storage of energy in the inertial flywheel load 52.

It is now seen that machine 48 has acted in the initial starting phase of machines 46 and 50 as the equivalent of a voltage dropping device which is the effective equivalent of the starting current resistors usually required to prevent overheating and possible burnout of the windings 54 and 58 of machines 46 and 50 during the initial current inrush when the machines are started from rest and under load. However, instead of wasting the power in voltage dropping resistors as is the usual case, the power is stored as energy in the flywheel mass 52 by raising it from a nominal speed up to approximately a maximum speed level.

Top speed of the machine 48 may be reached when the machines 46 and 50 have been accelerated to only a moderate percentage of their maximum speed, for example, less than 20 percent in a typical case. At this point the input-output energy relationships of the machines are such that the energy stored in the flywheel 52 is thereupon returned to the system to assist in the further acceleration of the machines 48 and 50 until they have reached a larger percentage of their maximum speed, say between 30 percent and 40 percent. At this point the machine 48 may have been decelerated to slightly below its nominal idling speed.

Further, at this point the voltages across the contacts 70 and 76 will have dropped to substantially zero and the contactors may thereupon be closed, as for example by actuating the push button switch 88 which energizes the solenoids 90 and 92 of the contactors 70 and 76. At the same time the field 62 of the machine 48 is removed from manual or automatic control and returned to control by the speed control 86 which then brings machine 48 back up to its nominal idling speed.

Closure of the contactors 70 and 76, of course, effects a circuit change from the series arrangement of machines 46, 48 and 50 to a parallel coupling across the conductors 30 and 32, whereafter the machines 46 and 50 may be readily accelerated up to maximum speed under the control of their exciting windings 60 and 64. It should be noted at this point that braking of the machines 46 and 50 from maximum speed down to zero may be readily effected by regenerative braking and that the contactors 70 and 76 are adapted to be opended when the current through them is substantially zero. Regenerative braking discussed in detail hereinbelow.

Figure 5:
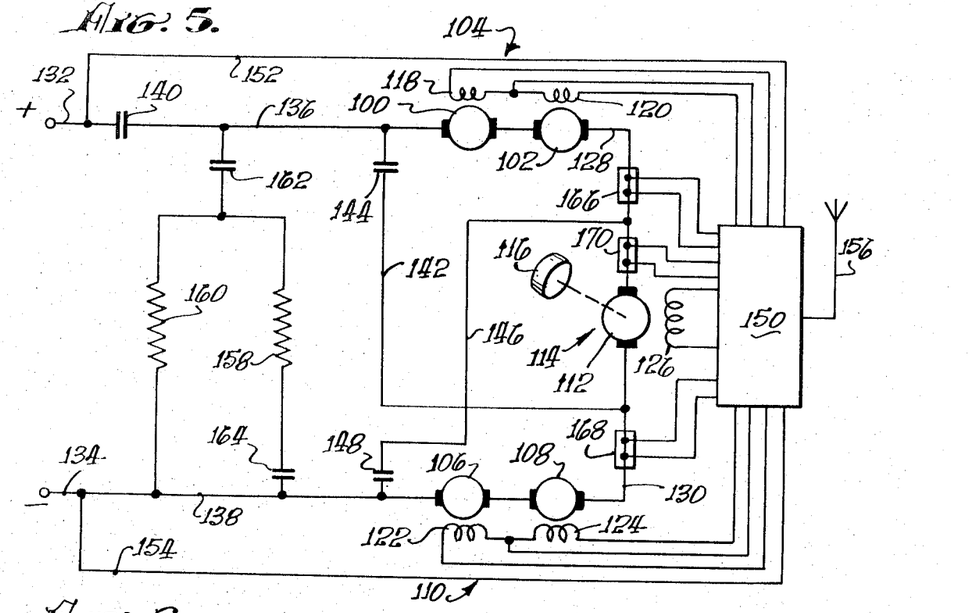
FIG. 5 is a schematic wiring diagram of one embodiment of a traction power motive system utilizing the invention.

EMBODIMENT OF FIG. 5

Turning now to FIG. 5, there is disclosed a traction motor system embodying the invention. The system will be disclosed as applied to a rapid transit car employing four traction motors which for the purposes of this disclosure are grouped as two pairs of series-connected motors, each series-connected pair of which, for all practical purposes herein, may be treated as a single dynamoelectric machine since all four motors are substantially identical in all electrical and mechanical characteristics. To this end the pair of motors 100 and 102 will be treated as machine 104, and the pair of motors 106 and 108 as machine 110. A fifth auxiliary dynamoelectric machine 112 forms a part of an energy pack 114 which further comprises a flywheel 116 coupled to the machine 112. Preferably machine 112 is substantially identical to each of the motors comprising the machines 104 and 110.

Separate excitation windings 118 and 120 are provided for the motors of machine 104 and the motors of machine 110 are provided with separate excitation windings 122 and 124. It should be noted that separately excited traction motors are merely preferred for better control but not necessarily essenital to the invention. On the other hand, the auxiliary machine 112 is characterized with more flexibiilty and is subject to better control for the various operational needs of the invention if it is provided with a separate extension winding, such as that shown at 126. However, winding 126 may provide a portion of the excitation if compound motor characteristics are desired, in which event the machine 112 may also be provided with a series-connected self-excitation winding (not shown) in addition to the separate excitation winding 126, as will be apparent to those skilled in this art.

One side of machine 104 is coupled to machine 112 by a conductor 128 and machine 112 to one side of machine 110 by a conductor 130, the series combination having the other sides of machines 104 and 110 coupled to the power supply conductors 132 and 134 respectively by conductors 136 and 138. A main contactor 140 in the conductor 136 is provided, the contactor 140 being nominally closed for all stationary-poised, starting, acceleration, and cruising or coasting operational modes of the traction vehicle as described hereinafter.

A conductor 142 provided with a normally-open contactor 144 couples conductors 130 and 136, and a conductor 146 provided with a normally-open contactor 148 couples conductors 128 and 138. A control circuit means 150 is provided with a pair of conductors 152 and 154 coupled to the power supply conductors 132 and 134, whereby power is available for the control function of the system and for the separate excitation windings 118, 120, 122, and 124 of machines 104 and 110. Control functions may be effected by means of manual or automatic control apparatus designated generally by the command symbol 156.

As thus far described, the system of FIG. 5 is substantially similar to that depicted in FIG. 4 and can be operated in similar fashion. Additionally, the system of FIG. 5 is illustrated with dynamic braking means to effect deceleration of the vehicle provided with traction machines 104 and 110 if braking in that mode is desired or necessary as explained in detail hereinafter. The dynamic braking means comprises a pair of power dissipation resistors 158 and 160 coupled in parallel across conductors 136 and 138. A normally-open contactor 162 is coupled to close the circuit to both resistors and a normally-open contactor 164 is coupled for the additional on-off control of the current in resistor 158. This dynamic braking means is adapted to provide braking horsepower which, aside from losses, is substantially equivalent to the motoring horsepower provided by the machines 104 and 110, in the manner described in detail below.

Current sensors 166, 168, and 170 are disposed in the conductors 128 and 130 to measure the current flowing in the running current windings of machines 104, 110, and 112, respectively. The signals from sensors 166, 168 and 170 are coupled into the control circuit means 150 to be compared with command signals from the command control 156 in order to effect the operational modes of the system and the operation of motors during the various modes, as described below.

OPERATION OF FIG. 5

In a typical situation the power supply conductors are coupled to a 600-volt direct current power supply which may be assumed to be fairly constant, aside from line losses. In the assumed situation, the machines 104 and 110 are comprised of traction motors in a rapid transit type car which may have a mass weight of the order of 100,000 pounds and adapted to attain a top running speed of about 105 miles per hour. A further assumption will be that the preferred maximum current in the armature winding of each of the five motors is of the order of 750 amperes.

It will be noted that the operational modes will be concerned with a basic reference vehicle speed, designated as "base speed" which is preferably of the order of about one-third top speed, i.e., about 35 mph. It will be apparent, of course, that any base speed may be selected for the particular vehicle situation as preferred or indicated for a particular system design.

The auxiliary machine 112 of this typical embodiment may perform a useful supplementary task in addition to driving the flywheel 116. Thus it may have coupled to it an alternating current generator to provide a reasonably nominal power supply for air conditioning, fluorescent lighting, or other alternating current needs on the vehicle. For this purpose the machine 112 may call on the power source for 50 amperes in the case selected for disclosure herein.

The various operational modes may encompass stop and poised-for-start, acceleration below base speed, transition at base speed, acceleration above base speed, cruise, coast, deceleration above base speed, transition at base speed, deceleration below base speed, and stop and poised-for-start. It will be apparent from the explanation of operation that the vehicle need not necessarily transit through all the operational modes for any one operational cycle.

The system may be under manual control, automatic control, or a combination of manual and automatic, with automatic control adapted to override erroneous commands by the manual control operator. Manual control could be of the general type indicated in FIG. 4 with the possible addition of ammeters coupled to the sensors 166, 168, and 170 to be read by the operator. In addition, of course, the operator would be provided with a vehicle speed indicator and voltmeters to provide him with voltage readings at various portions of the system.

Thus, since the operator is required to control merely the small-scale currents in the field windings of the machines, and to operate the contactors upon the manifestation of certain vehicle speed characteristics of the dynamoelectric machines, the control is greatly simplified from a manual standpoint.

If automatic control is desired then the required apparatus is not complex or complicated. For example, the output of the current sensors may be applied to solid state operational amplifiers to be compared with a command voltage analog of comnand current, the outputs of the amplifiers thereupon actuating the controls for the currents in the field windings to obtain the desired command currents in the running windings. Likewise, other arrangements available for this function will suggest themselves to those skilled in the art.

1. Stop and Poised-for-Start

Contactor 140 is closed and all others are open. Current flow through the running windings of machines 104 and 110 of about 50 amperes, for example, is drawn by the motor 112 idling at a reference speed of about 3500 rpm. No current will flow in the excitation windings of machines 104 and 110, hence no torque will be exerted on the driving wheels of the vehicle. It should be noted that even if the traction motors are of the self-excited type the nominal current draw by motor 112 is insufficient to create any more than a very low scale torque at the wheels and this is easily contained by the pneumatic parking brakes of the vehicle.

As noted, motor 112 is idling under a speed control effected by the circuit means 150 which regulates the current in the field 126 at a nearly full excitation value to maintain the aforesaid 3500 rpm. It will be noted that the terminal voltage of motor 112 is thus equal to the supply voltage of 600 volts across conductors 132 and 134 minus the IR drop in the armature running windings of the machines 104 and 110.

When it is desired to start the vehicle, the operator releases the parking brakes and moves the command control 156 to command a current increase from 50 to 750 amperes, thus initiating start and acceleration.

2. Acceleration Below Base Speed

The command causes full excitation to be applied to the field windings of machines 104 and 110, and removes the field 126 of auxiliary motor 112 from speed control. Thereafter the 750 ampere current is maintained by the control of current in the field 126. The full field excitation reacts with the full armature current to produce maximum tractive effort by machines 104 and 110. Simultaneously, machine 112 accelerates upwardly from its idling speed of 3500 rpm.

The increase of current under these circumstances from 50 to 750 amperes may be at any desired rate. In the case of a passenger vehicle it is desirable to avoid a near instantaneous change of acceleration from zero to a desired 3 miles-per-hour-per-second in which such a near abrupt change of acceleration would be manifested as a jerk. Therefore the command is preferably scheduled as what is known in the art as a jerk control command in order to reduce the starting jerk to an acceptable rate of change of acceleration value.

This is done by ramping the current in field 126 downwardly from it high value over a period of time, say two or three seconds, until the current is of such a value that acceleration is at a maximum only thereafter. In other words, the acceleration is caused to change over this period of time from zero to maximum by sensing and controlling the rate of change of current from 50 to 750 amperes through the current sensor 170.

It is apparent, of course, that the operation of the system is such that after the initial restriction by the jerk limited command all traction machines and the auxiliary motor are accelerated simultaneously by the maximum current of 750 amperes. At about one-half base speed of the vehicle, at which time the traction motors will be operating at about 875 rpm, the auxiliary motor 112 and its load including the flywheel 116 will have accelerated to about 5,000 rpm.

At this point in time, with traction motor speed of about 875 rpm for each of the four traction motors and an axiliary motor speed of about 5,000 rpm an equilibrium point has been reached in which the full 600 volts of the supply source are provided to the traction motors whereas the supply volts applied to the auxiliary motor have dropped to near zero. In other words, the motor 112 is using zero power from the power supply even though the full 750 amperes are flowing in its armature winding. When this point is reached the polarity of the voltage applied to its excitation field 126 is reversed and the machine 112 thereupon enters upon a generating mode by extracting energy from the flywheel 116 until the vehicle reaches base speed (with traction motor speed of about 1,750 rpm) and the machine 112 has been decelerated to about 3,150 rpm.

It will be noted that the generated voltage by machine 112 is additive to the supply voltage for application to the traction motors, and at base speed has reached 600 volts thus doubling the voltage applied to the traction machines. Thus, machine 112 supplies power to the machines 104 and 110 in the mode interval from one-half to unit base speed.

Figure 7:
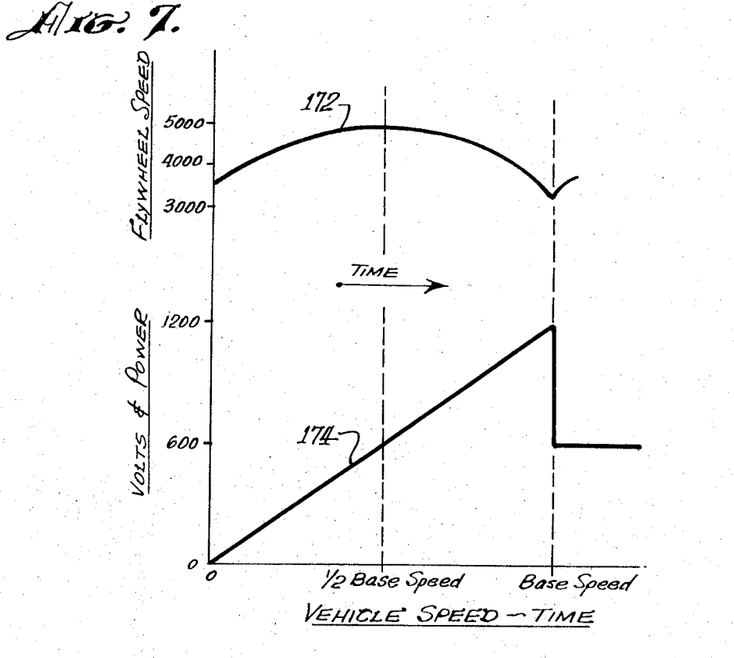
FIG. 7 is a time plot graph of the voltages appearing in various portions of the circuit during the initial acceleration mode of the systems of FIGS. 4, 5 and 6, and including a graph of flywheel speed plotted against vehicle speed; and, FIG. 8 is a schematic wiring diagram of an alternate embodiment of the auxiliary dynamoelectric machine employed in the embodiments of FIGS. 4, 5 and 6.

The speed and voltage relationships noted above are depicted in the curves illustrated in FIG. 7 which the abcissa represents vehicle speed. Since acceleration can be assumed to be substantially constant, other than the relatively minor deviation at the start as occasioned by the jerk limited command, the abscissa is also representative of time. The ordinate for the upper curve 172 represents flywheel speed, while that for the lower curve 174 is representative of voltage applied to the traction machines and the auxiliary motor. It is seen from this figure that the flywheel speed varies curvilinearly upward from 3,500 rpm at the start, to 5,000 rpm attained at one-half base speed. In the same interval the voltage applied to the motor 112 varies rectilinearly downward from 600 volts to zero while the voltage applied to the series-coupled machines 104 and 110 varies rectilinearly upward from zero to 600 volts.

At the one-half base speed point the field of motor 112 is reversed causing it to change over from motoring to generating mode, extracting energy from the flywheel and adding voltage to the supply voltage linearly until the total generated plus supply voltage reaches 1,200 volts at base speed. At base speed it is noted that the machine 112 has had its speed reduced to about 3,150 rpm as occasioned by the energy extraction. In other words, during the acceleration of the vehicle from start to about 35 mph base speed, the voltage applied to the running windings of each of the machines 104 and 110 has varied substantially linearly from zero to 600 volts without interruption of the substantially constant current flow of 750 amperes. Since the current can be assumed to be substantially constant the straight line 174 of FIG. 7 also is a plot of power in the system. Hence the area of the triangle bounded by the abscissa zero reference, the line 174 and the base speed line represents the kinetic energy stored in the vehicle at base speed.

Thus from zero vehicle speed up to one-half base speed, the energy pack 114 is absorbing energy from the power supply. From that point up to base speed the energy pack is restoring the stored energy to the machines 104 and 110. The net effect of this, as is apparent, is that the energy pack has absorbed and stored energy which, in the prior art, had been wasted in that critical period of time lapse during startup and initial acceleration, i.e., energy wasted as heat in the voltage dropping resistors of the prior art.

Of particular interest to note is the fact that energy restored by the energy pack 114 to the traction motor systems occurs only during that portion of vehicle operation between one-half and full base speed. This portion of the speed spectrum corresponds to about one-sixth the spread of the vehicle speed from zero up to maximum full speed. Accordingly, since energy varies with the square of the speed it is seen that the system of the present invention requires a flywheel capable of absorbing, storing and restoring energy which is only a thirty-sixth of the energy of the full flywheel systems proposed previously to operate over substantially the full speed range of the vehicle.

Another point of interest is that at base speed the voltage across the contactors 144 and 148 has been reduced to zero, and this fact provides the setting for the next operational mode of the vehicle.

3. Transition at Base Speed

Upon the vehicle reaching base speed, and the voltage across the contactors 144 and 148 having dropped to zero, the command signals the contactors to close, which places the machines 104 and 110 in parallel with the motor-generator machine 112 across the power supply conductors 132 and 134. At the same time the command may place the excitation field 126 under control of the speed control for motor-generator 112 so as to bring its speed back up from 3150 rpm to the basic reference speed of 3500 rpm.

The command signal also removes the fields 118, 120, 122, and 124 from maximum excitation control and places them on variable current subject to control in accordance with command.

It will be noted that machines 104 and 110 continue to draw 750 amperes apiece, and that machine 112 is down to a normal 50 amperes. Thus the power supply conductors 132 and 134 furnish 1550 amperes after transition. It will further be noted that the auxiliary machine 112 has both armature and exciting field windings reversed with respect to the power supply to them, and this condition continues into the next transition during the braking phase, with machine 112 running under speed control in this interval.

4. Acceleration Above Base Speed

From base speed (35 mph) up to top speed (105 mph) the acceleration is maintained by command of 750 amperes in each of the machines 104 and 110. This is done by controlled weakening of the excitation fields of the traction motor machines. The auxiliary machine 112 is merely maintaining its normal reference speed of 3,500 and carrying its supplementary load, if any.

5. Cruising

As top speed is approached, running currents in the machines 104 and 110 are reduced by increasing the field currents in their excitation fields until the running currents are just sufficient to maintain the speed.

6. Regenerative Deceleration Above Base Speed

The traction motor running current is commanded through zero to a negative value by increasing field excitation which converts the machines 104 and 110 from motoring to generating mode, thereby providing regenerative braking for the vehicle. Negative current may be any value for desired rate of deceleration up to 750 amperes for each machine, thus returning 1,500 amperes total back to the power supply conductors 132 and 134.

7. Transition at Base Speed

The car decelerates down to base speed, and when the currents in the excitation fields reach full maximum value, the command is made for the same running current in machines 104, 110 and 112. When the running current in each of the contactors 144 and 148 drops to zero, the contactors are opened which thereupon returns all machines to the original series-connected circuit configurations.

8. Regenerative Deceleration Below Base Speed

Excitation fields 118, 120, 122 and 124 are maintained at maximum and machine 112 becomes the control point by removing its field 126 from constant-speed control to permit the machine to speed up from 3,500 to about 5,000 rpm during which time it is absorbing energy from the machines 104 and 110. At this point, which is at about one-half base speed for the vehicle, the field winding 126 of the machine 112 is reversed and this machine begins to return energy to the system by way of aiding the machines 104 and 110 in their regenerative braking functions. It should be noted that the regenerative braking by the machines 104 and 110 decreases considerably as the vehicle slows down below base speed, hence the assist by the machine 112 from one-half base speed down to zero aids materially to retain the deceleration at a desired level in order that the braking effort does not consume an undesirable period of time before the vehicle can be parked and poised for the next run. The deceleration action of the machine 112 in this mode is essentially a mirror image (by reference to curve 172 of FIG. 7) of the acceleration action explained above.

DYNAMIC BRAKING MODE - FIG. 5

As noted aforesaid, the embodiment of FIG. 5 provides for dynamic braking mode as an alternate to regenerative braking. Such a situation may exist if there is no load on the wayside conductors capable of absorbing the regenerative power. In that event the voltage on the power supply conductors 132 and 134 will rise rapidly and no braking power will be applied to the vehicle. Perforce, then, the regenerative deceleration delineated at (6) above is aborted and the following operational mode is initiated.

6a. Dynamic Deceleration Above Base Speed

Contactor 140 is opened and contactors 162 and 164 are closed, which removes the motive system from exterior power and places parallel-coupled resistors 158 and 160 across the parallel-coupled machines 104, 110, and 112. Machine 112 continues as a motor (supplied by machines 104 and 110) at 3500 rpm under speed control, and braking power is applied by the resistor load on machine 104 and 110, the braking power being absorbed partially by machine 112 but mainly manifest as heat dissipated in resistors 158 and 160. Vehicle slows down to base speed. Current in the excitation fields of the machines 104 and 110 is increased as necessary to maintain maximum deceleration current of 750 amperes in each traction machine.

7aBase Speed Transition

As the vehicle reduces to and approaches base speed of 35 mph, the excitation current in the field winding of machines 104 and 110 reaches maximum and the same condition exists as in (7) transition above. At base speed command is made for the current in machines 104, 110 and 112 to become equalized and the current in each of the contactors 144 and 148 drops to zero. Thereupon they are opened which then changes the machines from parallel coupling to series connection. At the same time, contactor 164 is opened to remove resistor 158 from its parallel connection with resistor 160 across the machines. The excitation field 126 of machine 112 is removed from speed control and placed under command control, thus removing vehicular speed control from machines 104 and 110 and placing it under machine 112.

8a. Dynamic Deceleration Below Base Speed

The field excitation of machines 104 and 110 is maintained at maximum and field 126 is regulated to command negative current in the machine 112 which draws power from the system and causes it to accelerate from 3,500 rpm until at about one-half base speed the machine 112 reaches 5,000 rpm. At this point the machine 112 transfers from power absorption to restoration by having its excitation field 126 reversed, and at zero vehicle speed the machine 112 has been reduced to about 3,150 rpm. As the vehicle stops and parks, the braking condactor 162 is opened and the power supply contactor 140 is closed. At the same time, the field of machine 112 is returned to speed control which brings it back up to 3,500 rpm.

It will be noted that in mode (6a) the power generated by the parallel-connected machines is dissipated in parallel-connected resistors 138 and 160 whereas in mode (8a) the power generated by the series-connected machines is dissipated in a single resistor 160. With the values chosen for the sake of example each of the resistors 158 and 160 would have a resistance of about 0.8 ohms. So in mode (8a) there would be 750 amperes flowing in a single resistor of 0.8 ohms with approximately 600 volts impressed across it. In mode (6a) there would be 1,500 amperes flowing in two parallel resistors which have a combined resistance of 0.4 ohms with approximately the same applied voltage of about 600 volts.

Figure 6:
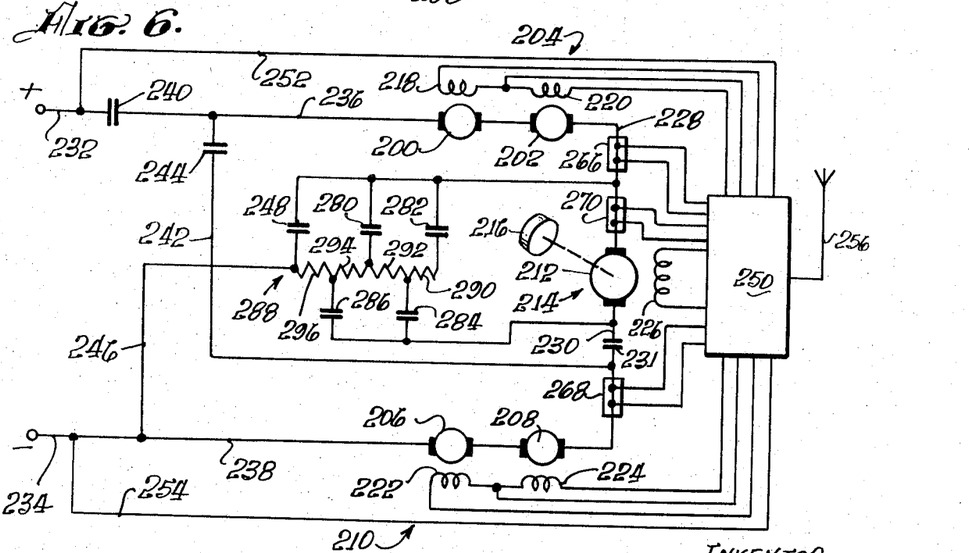
FIG. 6 is a schematic wiring diagram of another embodiment of a traction power motive system utilizing the invention.

EMBODIMENT OF FIG. 6

Turning now to FIG. 6, the embodiment shown there is similar to that of FIG. 5 in that it is arranged for operational modes of acceleration and regenerative deceleration identical to that of FIG. 5. However, the dynamic deceleration mode afforded by FIG. 6 is superior to that of FIG. 5 in that it is adapted, aside from losses, to provide braking horsepower that is double that of the motoring horsepower. In FIG. 6 the running windings of the motors 200 and 202 form a series-connected pair in the dynamoelectric machine 204, and in similar fashion the motors 206 and 208 have their running windings form a series-connected pair in the dynamoelectric machine 210. The dynamoelectric machine 212 is a part of the energy pack 214 which further includes the flywheel 216 drivingly coupled to the machine 212.

The motors of machines 204 and 210 have separately excited field windins 218 and 220 and windings 222 and 224, respectively. Machine 112 is provided with separate excitation by field winding 226. Conductors 228 and 230 couple the machine 212 to machines 204 and 210, respectively, to provide a series coupled arrangement to which is coupled the power supply conductors 232 and 234 by means of conductors 236 and 238, respectively, with a contactor 240 disposed in the conductor 236 between the power supply conductor 232 and the machine 204.

A conductor 242 having a contactor 244 couples the conductors 230 and 236, and another conductor 246 having a contactor 248 couples the conductors 228 and 238. The system of FIG. 6 is provided with a control circuit means, schematically represented by the block 250, which is coupled to the power supply conductors 232 and 234 by means of conductors 252 and 254 in order to control the excitation of the field windings 218, 220, 222, 224 and 226 of machines 204, 210, ans 212. Command means to effect the necessary controls for the various operational modes of the apparatus, is represented schematically by the symbol 256. Signals for the control means 250, representative of the current drawn by machines 204, 210 and 212 are derived, respectively, from current sensors 266, 268 and 270 disposed in the conductors 228 and 230 as shown.

A contactor 231 is disposed in the conductor 230, and with this sole exception (there being no corresponding contactor in FIG. 5) the circuit of FIG. 6 is identical in every respect to that of the corresponding portions of FIG. 5. Thus, the arrangement of FIG. 6 as described thus far is adapted to respond to commands and to operate in identical fashion to the corresponding circuit in FIG. 5 when the contactor 231 is closed during such operational modes from the (1) Stop and Poised-for-Start though the modes comprising (2) Acceleration Below Base Speed, (3) Transition at Base Speed, (4) Acceleration Above Base Speed, (5) Cruising, (6) Regenerative Deceleration Above Base Speed, (7) Transition at Base Speed, and (8) Regenerative Deceleration Below Base Speed, all as detailed at length hereinabove.

For dynamic braking the arrangment comprises a pair of contactors 280 and 282, one side of each being coupled to the conductors 228, and another pair of contactors 284 and 286 having one side of each coupled to the conductor 230 at a point intermediate the running winding of the machine 212 and the contactor 231. The other sides of the contactors 280, 282, 284 and 286 are coupled to a power dissipation, resistor 288 which comprises four resistance portions 290, 292, 294 and 296. Although shown as being comprised in a single resistor 288, it will be appreciated that the resistance portions 290, 292, 294 and 296 could be individual resistors, possibly having different power dissipation characteristics.

OPERATION OF FIG. 6

As noted briefly hereinabove, the embodiment of FIG. 6 has identical operational modes to those of FIG. 5 during acceleration, coasting and regenerative deceleration. In the event that the regenerative deceleration mode is not feasible or desirable, or if the operator desires to take advantage of the double braking horsepower of dynamic deceleration, the braking modes are as described below.

1. Transition from Drive to Decelerate

Traction current in the running windings of machines 204, 210 and 212 are commanded to zero by regulating the current in their excitation windings, whereupon contactors 240, 231 and 248 are opened. The excitation field winding currents of machines 204 and 210 are then commanded to zero and the polarity connections to windings 222 and 224 are reversed. This latter step naturally follows since the polarity sense of the running windings of machine 210 have been effectively reversed by the contactor openings indicated. Thereafter, contactor 282 is closed and also contactor 244 as well, if not already closed. It is now seen that the dynamoelectric machines 204 and 210 are coupled in series with all portions of the power dissipation resistor 288. The closing of contactor 284 returns the running winding of the auxiliary machines 212 to the circuit in parallel with resistor portion 290. It will be noted that machine 212 and its flywheel load 216 continues rotating at 3,500 rpm prior to and during this transition mode.

2. Deceleration from 100 to 50 mph

The field winding 226 of machine 212 is retained under speed control excitation and windings 218, 220, 222 and 224 of machines 204 and 210 are excited and controlled so as to cause the machines to operate as generators supplying 750 amperes to the resistor 288. This provides a constant power braking at 600 volts per motor, with increasing excitation current for the traction motor field windings since the braking current tends to reduce with decreased vehicles speed.

3. Decelerate from 50 to 25 mph

At about 50 mph the currents in the traction motor fields have reached maximum, at which point the auxiliary machine 212 is removed from speed control and the command given to its excitation field 226 for braking current in the running winding which causes the current in resistor portion 290 to approach and reduce to zero. Contactor 282 is thereupon opened, and it is now seen that all machines are coupled in series through resistor portions 292, 294, and 296 of resistor 288 with braking power applied to machine 212 acting as a motor to accelerate the flywheel 216. The braking current of the system is thus controlled by the excitation of the field winding 226 of the machine 212. the flywheel accelerates up to about 5,000 rpm which is reached at a vehicle speed of about 38 mph. At this point the auxiliary machine 212 transfers from power absorption to power restoration by having its excitation field 226 reversed. At a vehicle speed of about 25 mph the flywheel has decelerated to about 3,500 rpm by reason of the energy extracted from it to sustain the machine 212 in the power restoration phase.

4 Transition at 25 mph

Voltage across contactor 280 drops to zero, whereupon it is closed and contactor 284 is opened. The current in field winding 226 of machine 212 is adjusted until the voltage across contactor 286 is zero, whereupon it is closed. It will be noted that this latter condition requires a full reversal of the current in the field winding 226 of the auxiliary machine 212.

5. Decelerate from 25 mph to zero

The controlled excitation of field 226 of machine 212 controls the braking current in the running current windings of the traction motors whose excitation fields are still fully energized. At just above zero vehicle speed, the running is "cushioned off" by ramping the commanded braking current to zero. It should be noted that the braking action of the auxiliary machine 212 in this mode is first as a motor absorbing braking power, then as a generator supplying braking power, hence the flywheel is first accelerated from about 3,500 rpm to its upper speed of about 5000 rpm and then decelerated from this speed down to a speed in the general area of its reference speed of 3,500 rpm, or possibly slightly below.

6. Transition at Stop to Poise-to-Start

At zero vehicle speed, parking brakes are set, the excitation of the traction motor field windings is reduced to zero and contactors 244, 280 and 286 are opened. Contactor 231 is closed and the excitation of the field winding 226 of machine 212 is adjusted to give zero voltage across the contactor 240, which is thereupon closed. The machine 212 is then placed under speed control to maintain its reference speed of 3,500 rpm.

A final step is to reverse the polarity connection to windings 222 and 224 of machine 210, which were reversed in mode (1) above, so that all machines revert to running mode.

The foregoing description of the embodiments of FIGS. 4, 5 and 6 were concerned with rotatable apparatus comprising the preferred flywheel means coupled to the auxiliary machines as rotatable power absorption and restoration apparatus. An alternative to the flywheel arrangement is the apparatus disclosed in FIG. 8 wherein a pair of series-connected motors 300 and 302 are comprised in the dynamoelectric machines 304 and motors 306 and 308 in machine 310. The dynamoelectric machine 312 is shown as coupled in series with the machines 304 and 310. The machine 312 forms a part of the energy pack arrangement 314 and is coupled rotatably to the apparatus 316 which corresponds to the flywheel inertial apparatus hereinbefore described in connection with FIGS. 4, 5 and 6.

Figure 8:
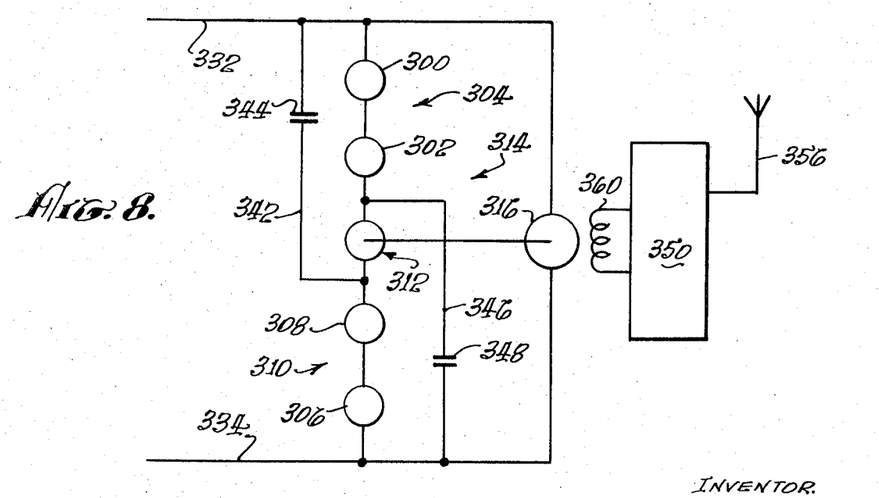

The series-coupled machines 304, 312 and 310 are connected to the power supply conductors 332 and 334. It will be observed that the common connection of the machines 310 and 312 are coupled by a conductor 342 through a normally open contactor 344 to the power supply conductor 332 and the common connection of the machines 304 and 312 by a conductor 346 through a normally-open contactor 348 to the other power supply conductor 334. The machine 312 may have coupled to it a constant load (not shown) such as an alternator or generator to provide auxiliary electrical current for any other desired or necessary purpose.

Since the power absorption resistors and contactors utilized therewith are not material to the operational modes employing the apparatus 316, these dynamic braking elements have not been shown. In that respect FIG. 8 more nearly approaches the configuration of FIG. 4. Also not shown and described are the excitation field windings of the machines since their functioning in the various operational modes would be substantially similar to those described in connection with FIGS. 4, 5 and 6. It will be understood, of course, that some or all of the elements not shown would be present for a completely functioning system.

As was said, the apparatus 316 corresponds to the flywheel apparatus described. In this case the apparatus comprises a dynamoelectric machine having its armature windings coupled to the power supply conductors 332 and 334. Machine 316 is preferably separately excited by a field winding 360 which is coupled to the control circuit means 350 arranged for control by a command input at 356. It will be understood that the control circuit means is similar in function to that of FIGS. 4, 5 and 6, and additionally adapted to control the field winding 360 as well as the excitation field windings (not shown) for machines 304 and 310.

In this embodiment, the energy pack 314 is preferably arranged to operate at a constant speed by the control of the current in either or both the fields of the machines 312 and 316. Thus in one operational mode, e.g., from start up to one-half base speed, the machine 312 will be motoring and supplying shaft power to machine 316 which will be generating and supplying power back into the system through its coupling to the power supply conductors 332 and 334. By this means the motoring machine 312 accomplishes its purpose vis-a-vis the machines 304 and 310, and the generating machine 316 has absorbed the shaft power of machine 312 and equivalently stored it by returning it to the system. In another operational mode, e.g. from one-half to unit base speed, the machine 312 will be generating and extracting shaft power from machine 316 which is then motoring and extracting power from the system.

From these two operational modes as briefly described, it is at once evident to those skilled in the art how the circuit means 350 may effect the excitation of the field windings of machines 312 and 316 to the extent necessary to cause the machines to operate in the desired mode at any instant of vehicle command. Thus, as is well known, the increase of excitation of one machine may cause it to change over from motoring to generating, and that concurrent decrease of excitation of the other machine may cause it to change over from generating to motoring.

It is thus seen that the embodiment of FIG. 8, as shown and described, is a completely functioning system identical in nearly all respects to that of FIG. 4 and adapted to operate in both acceleration and deceleration modes in similar fashion. Also, it is apparent that dynamic braking resistors and contactors of the types shown in FIGS. 5 or 6 could be employed with the system of FIG. 8 to achieve dynamic braking as described aforesaid in connection with those figures.

In connection with the depiction of the operational modes in FIG. 7 it will be appreciated that these curves are for the simplest case where it is assumed there are no losses of any kind in the system and that there is pure inertia in the loads coupled to the machines 104 and 160 and in the flywheel 116 coupled to the machine 112. The practical case makes provisions for these assumptions, but it will be appreciated that these relatively minor considerations from a novelty standpoint do not vitiate or dilute the degree of invention disclosed.

An operational function of the apparatus is available in which there is no transition from series to parallel coupling of the dynamoelectric machines as described aforesaid. In this latter function the control and command arrangement is such that the entire initial operation from standing-poised through acceleration to cruising is effected with a simple series coupling of the auxiliary and traction motor machines.

As an example of such an operation reference is made again to FIG. 6. In the standing-poised mode, with contactor 240 closed and the circuits to the excitation fields 218, 220, 222 and 224 of machines 204 and 210 open, the machine 212 will be operating at the basic reference speed of 3,500 rpm with its excitation field 226 energized under speed control. Upon initiation of the start-acceleration mode as commanded at 256 the field windings of machines 204 and 210 become fully excited and field winding 226 is removed from speed control, permitting the machine 212 to absorb the initial motoring energy undesired for the machines 104 and 110, thereby accelerating the machine 212 to just below the upper limit speed of about 5,000 rpm. Up to this point the operation in the "transitionless" system function has been identical to that previously described in connection with FIGS. 4, 5 and 6. However from this point on the functions differ.

In the transitionless system function the run of the traction vehicle is continued with acceleration up to cruise speed by decreasing the excitation of the machines 204 and 210 while regulating the excitation of machine 212 to maintain a speed of about 5,000 rpm or else to permit its speed to drift downwardly by extraction of energy from it by the auxiliary load coupled to the machine 212. In any event, the added increment of energy imparted to the flywheel 216 is returned, either to the auxiliary load as stated, or else by being utilized in a deceleration phase of machines 204 and 210 upon the braking of the vehicle from cruise to stop.

I claim:

1. In an electrical propulsion system for a vehicle adapted to operational modes from stationary-poised mode through running modes, said vehicle being provided with at least one traction dynamoelectric machine for motive power and conductors providing a source of electrical power:
   a. an energy pack on said vehicle, said pack including an auxiliary dynamoelectric machine adapted selectively to transform electrical power into mechanical power and mechanical power into electrical power,
   said pack further including rotatable means coupled to said auxiliary machine for selectively absorbing power from or restoring power to said auxiliary machine; and
   b. control circuit means coupling said auxiliary machine to said conductors during said stationary-poised mode for maintaining an idling speed of said energy pack and an idling energy storage in said rotatable means.

2. The system of claim 1 in which said auxiliary dynamoelectric machine has running current windings and a separately excited field winding.

3. The system of claim 2 in which said running current windings are coupled to said conductors and energized thereby during said stationary-poised mode.

4. The system of claim 2 in which said running current windings are coupled to said conductors and energized thereby during an acceleration portion of said running mode.

5. The system of claim 2 in which said running current windings are coupled to said conductors and energized thereby during said stationary-poised mode and an acceleration portion of said running mode.

6. The system of claim 1 in which said traction dynamoelectric machine has running current windings and separately excited field windings.

7. The system of claim 6 in which said running current windings are coupled to said conductors and energized thereby during said stationary-poised mode.

8. The system of claim 1 in which both said dynamoelectric machines have running current windings and separately excited windings.

9. The system of claim 8 in which said running current windings of said auxiliary dynamoelectric machine are coupled to said conductors and energized thereby during said stationary-poised mode.

10. The system of claim 8 in which said running current windings of said auxiliary dynamoelectric machine are coupled to said conductors and energized thereby during an acceleration portion of said running mode.

11. The system of claim 8 in which said running current windings of said auxiliary dynamoelectric machine are coupled to said conductors and energized thereby during said stationary-poised mode and an acceleration portion of said running mode.

12. The system of claim 8 in which said running current windings of said traction dynamoelectric machine are coupled to said conductors and energized thereby during said stationary-poised mode.

13. The system of claim 8 in which all said running current windings are coupled to said conductors and energized thereby during said stationary-poised mode.

14. The system of claim 8 in which all said running current windings are coupled to said conductors and energized thereby during an acceleration portion of said running mode.

15. The system of claim 8 in which all said running current windings are coupled to said conductors and energized thereby during said stationary-poised mode and an acceleration portion of said running mode.

16. The system of claim 8 in which said control circuit means couples said running current windings of one of said machines in series with said running current windings of the other of said machines for one vehicle operational mode.

17. The system of claim 8 in which said control circuit means couples said running current windings of one of said machines in parallel with said running current windings of the other of said machines for one vehicle operational mode.

18. The system of claim 8 in which said control circuit means couples said running current windings of one of said machines in series with said running current windings of the other of said machines for one vehicle operational mode followed by coupling in parallel for a succeeding operational mode.

19. The system of claim 18 in which said parallel coupling effects a reversal of current flow sense in said running current windings of said auxiliary dynamoelectric machine.

20. The system of claim 18 in which said control circuit means comprises switch means to cause a closure of a portion of said circuit means to effect the change of coupling of said running current windings from series to parallel,
said change of coupling being effected where the voltage across said portion of said circuit means is substantially zero.

21. The system of claim 20 in which said switch means is arranged to subsequently open said portion of said circuit means to effect a reversionary change of coupling of said running currents windings from parallel to series,
said reversionary change of coupling being effected when the current through said switch means is substantially zero.

22. In an electrical propulsion system for a vehicle having a plurality of traction dynamoelectric machines arranged for coupling to conductors providing a source of electrical power:
a. an energy pack including an auxiliary dynamoelectric machine;
b. circuit means coupling said traction and auxiliary dynamoelectric machines to said power source conductors; and
c. control means associated with said circuit means for commanding vehicular propulsion modes by said machines from a stationary-poised vehicle mode through an acceleration mode in which said stationary mode is characterized by operation of said energy pack at a reference speed,
whereafter upon a command to start said vehicle through at least an initial portion of the acceleration mode said control means effects an application of power to said traction machines from said conductors and effects an acceleration of the speed of said energy pack by the application of additional power thereto from said conductors.

23. The propulsion system of claim 22 in which said energy pack is adapted, upon reaching a substantially higher speed imparted thereto by said additional power from said conductors, to thereafter restore and furnish said additional power to said traction machines whereupon said energy pack decelerates to about said reference speed.

24. The propulsion system of claim 22 in which said auxiliary dynamoelectric machine is separately excited by a field winding and said control means effects speed control of said auxiliary machine in said stationary-poised mode of said vehicle,
said control means comprising means for varying the current in said field winding upon initiation of said acceleration mode of said vehicle.

25. The propulsion system of claim 24 in which said traction machines are separately excited by field windings.

26. The propulsion system of claim 22, in which said circuit means couples said machines in series across said power source conductors with the running current for said auxiliary machine simultaneously traversing said traction machines in said stationary-poised mode.

27. The propulsion system of claim 22 in which said circuit means couples said machines in series across said power source conductors with the running current for said traction machines simultaneously traversing said auxiliary machine in said initial portion of said acceleration mode.

28. The propulsion system of claim 22 in which said circuit means couples said machines in series across said power source conductors with the running current traversing said machines in both said stationary poised mode and initial portion of said acceleration mode.

29. An electrical system comprising:
a. a plurality of electrical devices, one of which comprises a dynamoelectric machine adapted to motoring and generating modes interchangeably;
b. conductor means arranged for coupling to a source of electric power; and
c. circuit means for coupling said devices in series to said conductor means,
said circuit means including control means arranged for a power input to said devices from said conductor means and to cause said one machine to vary between said motoring and generating modes while said devices are coupled to said conductor means and said power source.

30. The electrical system of claim 29 in which said devices are dynamoelectric machines,
said one dynamoelectric machine providing electrical power to the others when operating in said generating mode.

31. The electrical system of claim 29 in which said one dynamoelectric machine is coupled to rotatable apparatus adapted to absorb and equivalently store mechanical power from said one machine when operating in said motoring mode, and to equivalently restore and furnish mechanical power to said one machine when operating in said generating mode.

32. The electrical system of claim 31 in which said rotatable apparatus comprises an inertial mass.

33. The electrical system of claim 31 in which said rotatable apparatus comprises a dynamoelectric machine coupled to said conductor means and adapted to operate in motoring and generating modes.

34. The electrical system of claim 31 in which said rotatable apparatus is accelerated when said one dynamoelectric machine is motoring and is decelerated when said one machine is generating.

35. The electrical system of claim 31 in which said rotatable apparatus operates at a substantially constant speed when said one machine is motoring and generating.

36. An electrical system comprising:
a. a plurality of electrical devices; and
b. circuit means including coupling means, for selectively coupling said devices in series in one circuit mode with current flow sense therein in one directional sense, and selectively coupling said devices in another circuit mode with current flow sense in at least one of said devices in a reverse directional sense relative to the current flow sense therein in said one circuit mode, said one of said devices being a dynamoelectric machine, said coupling means being operable to selectively couple said devices in said another circuit mode with said dynamoelectric machine producing a generated voltage.

37. The system of claim 36 in which said another circuit mode is a parallel coupling of said devices.

38. The system of claim 37 in which two of said devices are dynamoelectric machines.

39. The system of claim 37 in which all said devices are dynamoelectric machines.

40. The system of claim 36 in which one of said circuit means comprises switch means.

41. The system of claim 36 in which said circuit means comprises first and second coupling means, one terminal of a first one of said devices being coupled by said first coupling means to one terminal of a second one of said devices, one terminal of a third one of said devices being coupled by said second coupling means to another terminal of said second one of said devices, said system further comprising third means for coupling another terminal of said first one of said devices to one side of a source of electrical power and fourth means for coupling another terminal of said third one of said devices to another side of said current source.

42. The system of claim 41 in which said first and second coupling means are first and second conductor means, respectively, and said coupling means comprises switch means.

43. The system of claim 42 in which said switch means comprises a first contactor adapted to couple said first conductor to said another terminal of said third one of said devices, and a second contactor adapted to couple said second conductor to said another terminal of said first one of said devices.

44. The system of claim 42 in which said switch means comprises a first contactor means adapted to couple said one side of said current source to said second conductor means, and a second contactor means adapted to couple said another side of said current source to said first conductor means.

45. An electrical system comprising:

a. first, second and third electrical apparatuses coupled in series arrangement with one terminal of said first apparatus arranged for coupling to one side of a source of electrical power, the other side of which is arranged for coupling to one terminal of said third apparatus; and b. circuit means including switch means for coupling the other terminal of said third apparatus to the said one side of said source and the said other side of said source to the other terminal of said first apparatus, whereby when said switch means is actuated said apparatuses are thereby coupled in parallel arrangement across said source with current flow through said second apparatus in reverse sense, said switch means being actuated to couple said apparatuses in said parallel arrangement when the voltages across said switch means are substantially zero.

46. The system of claim 45 in which said switch means is actuated to uncouple said parallel arrangement when the current through said switch means is substantially zero.

47. The system of claim 45 in which said first and second apparatuses comprise dynamoelectric machines.

48. The system of claim 47 in which in one system operational mode said second apparatus is functioning as a motor to absorb electrical power from said system and in another operational mode is functioning as a generator to restore electrical power to said system.

49. The system of claim 45 in which said first and third apparatuses comprise dynamoelectric machines.

50. The system of claim 45 in which all said apparatuses comprise dynamoelectric machines.

51. The system of claim 45 in which said second apparatus comprises a dynamoelectric machine coupled to rotatable apparatus adapted selectively to absorb and equivalently store power from or to equivalently restore and furnish power to said second apparatus.

52. The system of claim 51 in which said rotatable apparatus comprises an inertial load adapted in one mode of operation of said system to absorb power from said second apparatus and in another mode to restore and furnish power to said second apparatus.

53. The system of claim 52 in which said inertial load comprises flywheel means.

54. A power system for operational modes of a dynamic mechanical entity comprising:

a. a first power shaft drivingly coupled with the entity;

b. a first dynamoelectric machine having a first motive power winding drivingly coupled to said first shaft;

c. a second power shaft;

d. a second dynamoelectric machine adapted for motoring or generating and having a second motive power winding drivingly coupled to said second shaft;

e. rotatable apparatus drivingly coupled with said second shaft and arranged to interchangeably absorb and equivalently store or restore and furnish rotational energy from or to said second machine; and f. circuit means including conductors arranged for coupling to a source of electrical power, said circuit means adapted to coupling both said power windings with said conductors in a first operational mode with said first shaft stationary and said apparatus driven by said second shaft at a reference idling speed with a basic rotational energy storage in said apparatus, whereafter during at least one of said operational modes said circuit means effects an increase upwardly from idling speed of said second shaft.

55. The power system of claim 54 in which said circuit means are adapted to effect a reactive excitation of said first machine to initiate a second operational mode of said first shaft, both said machines motoring and accelerating said first and second shafts during at least an initial portion of said second operational mode to impart additional energy storage to said apparatus.

56. The power system of claim 55 in which said initial portion of said second mode is followed by a subsequent portion in which said second machine transfers from motoring to generating and said apparatus restores and furnishes rotational energy to said second machine for generation of power to be utilized by said first machine for acceleration thereof during said second operational mode.

57. The power system of claim 54 in which said rotatable apparatus is an inertial mass.

58. The power system of claim 57 in which said inertial mass is a flywheel adapted to the acquisition of kinetic energy that is a fraction of the total kinetic energy imparted to said entity by said first shaft.

59. The power system of claim 58 in which the fractional energy acquired by said flywheel is of the order of about 3 percent of the total kinetic energy of said entity.

60. The power system of claim 54 in which said circuit means couples said first and second motive power windings in series and to said conductors for said first operational mode.

61. The power system of claim 60 in which said circuit means maintains said series coupling of said windings from said first mode through said second mode.

62. The power system of claim 61 in which said circuit means couples said first and second motive power windings in parallel and to said conductors upon the completion of said second operational mode.

63. The power system of claim 54 in which said circuit means couples said first and second motive power windings in series and to said conductors for said second operational mode.

64. A traction vehicle motive power system comprising:
   a. first and second dynamoelectric machines having respective first and second motive power windings;
   b. rotatable apparatus coupled to said first winding and arranged for selective absorption and equivalent storage or equivalent restoration and furnishing rotational energy from or to said first machine, said second winding being drivingly coupled with the vehicle;
   c. conductor means providing a source of electrical power,
   d. circuit means arranged for coupling said motive power windings to said conductors with the current flow sense in said windings in one directional sense; and
   e. circuit switching means for one of said motive power windings to effect a reversal of directional sense of current flow sense therein.

65. The traction vehicle motive power system of claim 64 in which said first dynamoelectric machine comprises a separate excitation winding coupled to said circuit means and arranged for coupling to said conductors.

66. The traction vehicle motive power system of claim 64 in which said second dynamoelectric machine comprises a separate excitation winding coupled to said circuit means and arranged for coupling to said conductors.

67. The traction vehicle motive power system of claim 64 in which both said dynamoelectric machines comprise separate excitation windings coupled to said circuit means and arranged for coupling to said conductors.

68. The traction vehicle motive power system of claim 64 in which said rotatable apparatus comprises a third dynamoelectric machine having a third motive power winding coupled to conductors arranged to absorb power from or furnish power to said third winding.

69. The traction vehicle motive power system of claim 68 in which said third winding is coupled to said source conductors furnishing power to said first and second windings.

70. The traction vehicle motive power system of claim 69 in which said rotatable apparatus is controlled to run at a substantially constant speed.

71. The traction vehicle motive power system of claim 64 in which said rotatable apparatus comprises an inertial mass.

72. The traction vehicle motive power system of claim 71 in which said inertial mass is a flywheel.

73. A motive power system for operational modes of a vehicle comprising:
   a. first and second dynamoelectric machines having respective first and second motive power windings;
   b. rotatable apparatus coupled to said first winding and arranged for selective absorption and equivalent storage or equivalent restoration and furnishing rotataional enery from or to said first machine, said second winding being drivingly coupled with the vehicle;
   c. conductor means providing a source of electrical power; and
   d. circuit means for continuously coupling said motive power windings with said conductors and controlling the current flow therein during the operational modes whereby in one operational mode of said vehicle both said windings are absorbing power from said conductors, and in a subsequent operational mode one of said windings is restoring power to said circuit means and to the other of said windings.

74. The motive power system of claim 73 in which said one of said windings is said first winding.

75. The motive power system of claim 74 in which said rotatable apparatus comprises an inertial flywheel mass.

76. The motive power system of claim 75 in which both said dynamoelectric machines comprise separate excitation windings with the current in one of said windings being regulated during said one operational mode.

77. The motive power system of claim 76 in which the current in the excitation winding of said first machine is regulated.

78. The motive power system of claim 76 in which the current in the excitation winding of said second machine is regulated during said subsequent operational mode.

79. An energy pack system comprising:
   a. first rotatable apparatus adapted selectively to transform electrical power into mechanical power and mechanical power into electrical power;

b. second rotatable apparatus coupled to said first apparatus and adapted selectively to absorb and equivalently store mechanical power from or to equivalently restore and furnish mechanical power to said first apparatus;
c. circuit means for continuously coupling said first apparatus to electrical conductor means; said conductor means being adapted to furnish electrical power to or absorb electrical power from said first apparatus; and
d. control means in said circuit means for effecting controlled modes for said system in which in a first mode said first apparatus is absorbing electrical power from said conductor means and transforming it into a mechanical power input into said second apparatus,
and in a second mode said first apparatus is absorbing mechanical power from said second apparatus and transforming it into electrical power furnished to said conductor means,
said control means being adapted to effect a reversal of the current flow through said first rotatable apparatus without effecting a discontinuity of said continuous coupling thereof to said conductor means.

80. The energy pack apparatus of claim 79 in which said second rotatable apparatus comprises an inertial mass.

81. The energy pack apparatus of claim 80 in which said inertial mass comprises a flywheel.

82. The energy pack apparatus of claim 79 in which said second rotatable apparatus comprises a dynamoelectric machine having a motive power winding coupled to said conductor means.

83. The energy pack apparatus of claim 82 in which said first and second rotatable apparatuses are governed at a substantially constant speed.

84. An electrical system comprising:
an electrical device operable to absorb electrical power in response to one polarity of voltage applied thereto and to restore at least some of the absorbed electrical power in response to another polarity of voltage applied thereto;
a dynamoelectric machine for converting electrical power into mechanical power, said machine being connected to a load to thereby accelerate said load to a predetermined speed in response to the application of electrical power to said machine; and,
control circuit means operable to apply electrical power to said dynamoelectric machine and to said electrical device and to selectively apply said one polarity of voltage to said electrical device during an initial acceleration period of said load and said another polarity of voltage to said electrical device during a subsequent acceleration period of said load, said electrical device absorbing at least a portion of the electrical power applied to said dynamoelectric machine with said one polarity of voltage applied thereto and restoring at least some of the absorbed electrical power to said dynamoelectric machine with said another polarity of voltage applied thereto.

85. The system of claim 84 wherein said electrical device is a separately excited, auxiliary dynamoelectric machine drivingly connected to an inertia device, said voltage of said one and another polarities being applied to said auxiliary dynamoelectric machine to separately excite said auxiliary dynamoelectric machine.

86. The system of claim 85 wherein said auxiliary dynamoelectric machine is operable in a motoring mode when separately excited by said one polarity of voltage and is operable in a generating mode when separately excited by said another polarity of voltage, said auxiliary dynamoelectric machine absorbing said at least a portion of the electrical power applied to said dynamoelectric machine in said motoring mode and restoring said at least some of the absorbed electrical power to said dynamoelectric machine in said generating mode.

87. The system of claim 86 wherein said control circuit means includes means for selectively applying said electrical power to said dynamoelectric machine and said auxiliary dynamoelectric machine in series in one circuit mode with current flow therein in one directional sense and selectively applying said electrical power to said dynamoelectric machine and said auxiliary dynamoelectric machine in parallel in another circuit mode with current flow sense in said dynamoelectric machine in a reverse directional sense relative to the current flow sense therein in said one circuit mode.

88. A method for accelerating a dynamoelectric machine with a coupled load to a predetermined speed comprising the steps of:
applying power from a power source to the dynamoelectric machine to accelerate the machine and its load;
absorbing at least a portion of the power applied to the dynamoelectric machine in associated energy absorbing apparatus during the acceleration of the machine to a first speed below the predetermined speed; and,
restoring at least a portion of the power absorbed in the associated energy absorbing apparatus to the dynamoelectric machine during the acceleration of the machine from the first speed to the predetermined speed.

89. The method of claim 88 wherein at least a portion of the applied power is absorbed by:
connecting the dynamoelectric machine electrically in series with an auxiliary dynamoelectric machine running at a predetermined idling speed; and
increasing the speed of the auxiliary machine as the dynamoelectric machine is being accelerated.

90. The method of claim 88 wherein at least a portion of the applied power is absorbed by:
connecting the dynamoelectric machine electrically in series with a separately excited, auxiliary dynamoelectric machine running at a predetermined idling speed and having an exciting voltage of one polarity applied thereto; and
increasing the exciting voltage to increase the speed of the auxiliary dynamoelectric machine as the dynamoelectric machine is being accelerated.

91. The method of claim 90 wherein at least a portion of the absorbed power is restored by:
reversing the polarity of the exciting voltage at a first speed of the auxiliary dynamoelectric machine above the idling speed.

92. The method of claim 91 including the step of:
disconnecting the auxiliary dynamoelectric machine from in series with the dynamoelectric machine at a second speed of the auxiliary dynamoelectric machine below the first speed.

93. In a method for controlling a propulsion system of a vehicle from a stationary-poised mode to a running mode, the steps of:
   maintaining an auxiliary dynamoelectric machine at an idling speed during the stationary-poised mode;
   accelerating the auxiliary machine from the idling speed to a higher speed during a first portion of the running mode to absorb power from the propulsion system during the first portion of the running mode; and
   decelerating the auxiliary machine from the higher speed to approximately the idling speed during a subsequent portion of the running mode to restore at least a portion of the absorbed power to the propulsion system during the subsequent portion of the running mode.

94. The method of claim 93 wherein the vehicle propulsion system includes a plurality of traction dynamoelectric machines and including the steps of:
   connecting the auxiliary dynamoelectric machine electrically in series with the traction dynamoelectric machines during the first and subsequent portions of the running mode; and
   thereafter disconnecting the auxiliary dynamoelectric machine from in series with the traction dynamoelectric machines.

95. In a method for operating a motive power system including a first dynamoelectric machine and an auxiliary dynamoelectric machine each having a plurality of windings, the method comprising the steps of:
   coupling a first winding of each of the machines in series with a source of power;
   energizing a second winding of each of the machines to operate all of the machines as motors and to accelerate all of the machines;
   reversing the energization of the second winding of the auxiliary machine to operate the auxiliary machine as a voltage generator and to decelerate the auxiliary machine; and
   coupling the first winding of each of the machines in parallel with the source of power when a predetermined relationship exists between the voltage generated by the auxiliary machine and the voltage across the first machine.

96. The method of claim 95 wherein the predetermined relationship exists when the voltage generated by the auxiliary machine is approximately equal to the voltage across the first machine.

97. The method of claim 95 wherein the first winding of each machine is an armature winding and wherein the second winding of each machine is a field winding, the method including the step of applying a predetermined voltage to the field winding of the auxiliary machine to operate the auxiliary machine at a predetermined idling speed prior to accelerating all of the machines.

98. The method of claim 97 wherein the predetermined relationship exists between the voltage generated by the auxiliary machine and the voltage across the first machine when the auxiliary machine is decelerated to approximately the predetermined idling speed.

99. The method of claim 97 wherein the predetermined relationship exists when the voltage generated by the auxiliary machine is approximately equal to the voltage across the first machine.

* * * * *